United States Patent
Lee et al.

(10) Patent No.: US 8,364,157 B2
(45) Date of Patent: Jan. 29, 2013

(54) METHODS FOR COORDINATING RADIO ACTIVITIES OF DIFFERENT RADIO ACCESS TECHNOLOGIES AND APPARATUSES UTILIZING THE SAME

(75) Inventors: Chun-Sheng Lee, Zhubei (TW); Chin-Fa Hsu, Zhubei (TW); Wei-Sheng Yin, Jhubei (TW)

(73) Assignee: Mediatek Inc., Hsin-Chu (TW)

(*) Notice: Subject to any disclaimer, the term of this patent is extended or adjusted under 35 U.S.C. 154(b) by 337 days.

(21) Appl. No.: 12/880,877

(22) Filed: Sep. 13, 2010

(65) Prior Publication Data

US 2011/0207490 A1 Aug. 25, 2011

Related U.S. Application Data

(60) Provisional application No. 61/307,895, filed on Feb. 25, 2010.

(51) Int. Cl.
*H04W 72/00* (2009.01)

(52) U.S. Cl. ...... 455/450; 455/451; 455/452.1; 455/452.2; 375/220

(58) Field of Classification Search ......... 455/450, 455/451, 452.1, 452.2, 454, 41.2; 375/220; 370/286
See application file for complete search history.

(56) References Cited

U.S. PATENT DOCUMENTS

| | | | | |
|---|---|---|---|---|
| 5,581,717 A * | 12/1996 | Boggs et al. | | 712/208 |
| 6,842,607 B2 * | 1/2005 | Godfrey et al. | | 455/41.2 |
| 7,031,417 B2 * | 4/2006 | Jin | | 375/354 |
| 7,099,670 B2 * | 8/2006 | Alicherry et al. | | 455/446 |
| 7,099,671 B2 * | 8/2006 | Liang | | 455/450 |
| 7,224,979 B2 * | 5/2007 | Singhal et al. | | 455/456.1 |
| 7,248,877 B2 * | 7/2007 | Skafidas et al. | | 455/450 |
| 7,415,279 B2 * | 8/2008 | Liang | | 455/450 |
| 7,460,513 B2 * | 12/2008 | Osterling | | 370/342 |
| 7,483,717 B2 * | 1/2009 | Champion et al. | | 455/557 |
| 7,656,825 B2 * | 2/2010 | Stanwood et al. | | 370/275 |
| 7,702,004 B2 * | 4/2010 | Deas et al. | | 375/220 |
| 7,970,350 B2 * | 6/2011 | Sheynman et al. | | 455/41.1 |
| RE42,722 E * | 9/2011 | Godfrey | | 455/552.1 |
| 8,090,337 B2 * | 1/2012 | Apostolos et al. | | 455/296 |
| 8,107,999 B2 * | 1/2012 | Pandruvada | | 455/552.1 |
| 2002/0163466 A1 * | 11/2002 | Jin | | 342/356 |
| 2003/0035500 A1 * | 2/2003 | Jin | | 375/354 |
| 2004/0116160 A1 * | 6/2004 | Deas et al. | | 455/570 |
| 2008/0144545 A1 * | 6/2008 | Stanwood et al. | | 370/295 |
| 2008/0161030 A1 | 7/2008 | Pernu | | |
| 2011/0016008 A1 * | 1/2011 | Maraz et al. | | 705/21 |
| 2011/0283295 A1 * | 11/2011 | Ali et al. | | 719/318 |

* cited by examiner

*Primary Examiner* — Minh D Dao
(74) *Attorney, Agent, or Firm* — McClure, Qualey & Rodack, LLP

(57) ABSTRACT

An apparatus for coordinating radio activities of different radio access technologies (RATs) includes a first RAT module, a second RAT module and an arbiter. The first RAT module receives and transmits radio frequency (RF) signals from and to a first cellular network through an antenna, and synchronizes transceiving timings with the first cellular network using a first clock. The second RAT module receives and transmits RF signals from and to a second cellular network through the antenna, and synchronizes transceiving timings with the second cellular network using a second clock. The arbiter coordinates a first radio activity requested by the first RAT module and a second radio activity requested by the second RAT module to avoid radio activity collision by using a third clock.

20 Claims, 10 Drawing Sheets

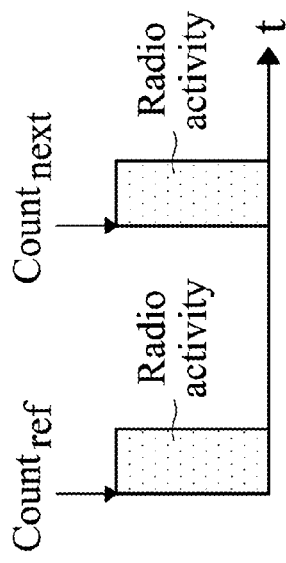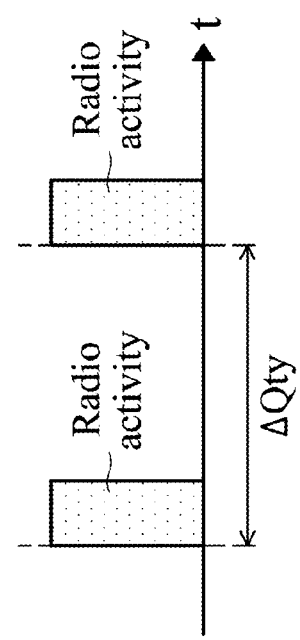

METHODS FOR COORDINATING RADIO ACTIVITIES OF DIFFERENT RADIO ACCESS TECHNOLOGIES AND APPARATUSES UTILIZING THE SAME

CROSS REFERENCE TO RELATED APPLICATIONS

This application claims the benefit of U.S. Provisional Application No. 61/307,895 filed 2010 Feb. 25 and entitled "Methods for coordinating radio activities requested by different radio access technologies (RAT) modules sharing a single antenna and systems using the same". The entire contents of which are hereby incorporated by reference.

BACKGROUND OF THE INVENTION

1. Field of the Invention

The invention relates to a method for coordinating radio activities of different radio access technologies (RATs), and more particularly to a method for coordinating radio activities of different RATs to prevent radio activity collision from occurring.

2. Description of the Related Art

The term "wireless", normally refers to an electrical or electronic operation, which is accomplished without the use of a "hard wired" connection. "Wireless communications", is the transfer of information over a distance without the use of electrical conductors or wires. The distances involved may be short (a few meters for television remote controls) or very long (thousands or even millions of kilometers for radio communications). The best known example of wireless communications is the cellular telephone. Cellular telephones use radio waves to enable an operator to make phone calls to another party, from many locations world-wide. They can be used anywhere, as long as there is a cellular telephone site to house equipment that can transmit and receive signals, which are processed to transfer both voice and data to and from the cellular telephones.

There are various well-developed and well-defined cellular communications technologies. For example, the Global System for Mobile communications (GSM) is a well-defined and commonly adopted communications system, which uses time division multiple access (TDMA) technology, which is a multiplex access scheme for digital radio, to send voice, data, and signalling data (such as a dialed telephone number) between mobile phones and cell sites. The CDMA2000 is a hybrid mobile communications 2.5G/3G (generation) technology standard that uses code division multiple access (CDMA) technology. The UMTS (Universal Mobile Telecommunications System) is a 3G mobile communications system, which provides an enhanced range of multimedia services over the GSM system. The Wireless Fidelity (Wi-Fi) is a technology defined by the 802.11 engineering standard and can be used for home networks, mobile phones, video games, to provide a high-frequency wireless local area network.

With the advanced development of wireless communications technologies, it is now possible to provide multiple wireless communications services using different or the same communications technologies in one mobile station (MS). In order to provide an efficient and reliable radio services, methods for coordinating radio activities in different radio access technologies is highly required.

BRIEF SUMMARY OF THE INVENTION

Apparatuses and methods for coordinating radio activities of different radio access technologies (RATs) are provided.

An embodiment of an apparatus for coordinating radio activities of different radio access technologies (RATs) comprises a first RAT module, a second RAT module and an arbiter. The first RAT module receives and transmits radio frequency (RF) signals from and to a first cellular network through an antenna, and synchronizes transceiving timings with the first cellular network using a first clock. The second RAT module receives and transmits RF signals from and to a second cellular network through the antenna, and synchronizes transceiving timings with the second cellular network using a second clock. The arbiter coordinates a first radio activity requested by the first RAT module and a second radio activity requested by the second RAT module to avoid radio activity collision by using a third clock.

Another embodiment of a method for coordinating radio activities of different radio access technologies (RATs) comprises receiving, by an arbiter, a first request for using an antenna to perform a first radio activity, wherein the first request carries information regarding timing of the first radio activity and a forthcoming first radio activity and the timing is represented by using a first clock synchronized with a first cellular network from and to which a first RAT module receives and transmits radio frequency (RF) signals; receiving, by the arbiter, a second request for using the antenna to perform a second radio activity, wherein the second request carries information regarding timing of the second radio activity and the timing is represented by using a second clock synchronized with a second cellular network from and to which a second RAT module receives and transmits RF signals; and coordinating, by an arbiter, the first radio activity, the forthcoming first radio activity and the second radio activity without radio activity collision by using a third clock.

Another embodiment of a method for coordinating radio activities of different radio access technologies (RATs) comprises: obtaining, by an arbiter, a first start time of a forthcoming radio activity represented by a first clock from a first request transmitted by a first RAT module; converting, by the arbiter, the first start time onto the time scale of a third clock; storing, by the arbiter, the converted first start time in a register or a specific address of a memory; obtaining, by the arbiter, a second start time and a duration of a forthcoming radio activity represented by a second clock from a second request transmitted by a second RAT module; converting, by the arbiter, the second start time and the duration onto the time scale of the third clock; and determining, by the arbiter, whether the forthcoming radio activity for the first RAT module collides with the forthcoming radio activity for the second RAT module by inspecting whether the stored first start time falls within the converted duration after the converted second start time.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein:

FIG. 7 is a timing diagram showing the start time of a current radio activity and a forthcoming radio activity;

FIG. 8 is a timing diagram showing the time difference between a current radio activity and a forthcoming radio activity;

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

With mobile stations (MS, which may be interchangeably referred to as user equipments (UE)), now capable of handling different radio access technologies (RAT), such as at least two of GSM/GPRS/EDGE (Global System for Mobile Communications/General Packet Radio Service/Enhanced Data rates for Global Evolution), WCDMA (Wideband Code Division Multiple Access), cdma2000, WiMAX (Worldwide Interoperability for Microwave Access), TD-SCDMA (Time Division Synchronous Code Division Multiple Access), LTE (Long Term Evolution), and TD-LTE (Time Division Long Term Evolution) RATs, and the similar, an MS may locate two or more public land mobile network (PLMN) in different RATs when switched on. The public land mobile network (PLMN) is a wireless communications system intended for use by subscribers, such as an MS.

Figure 1:
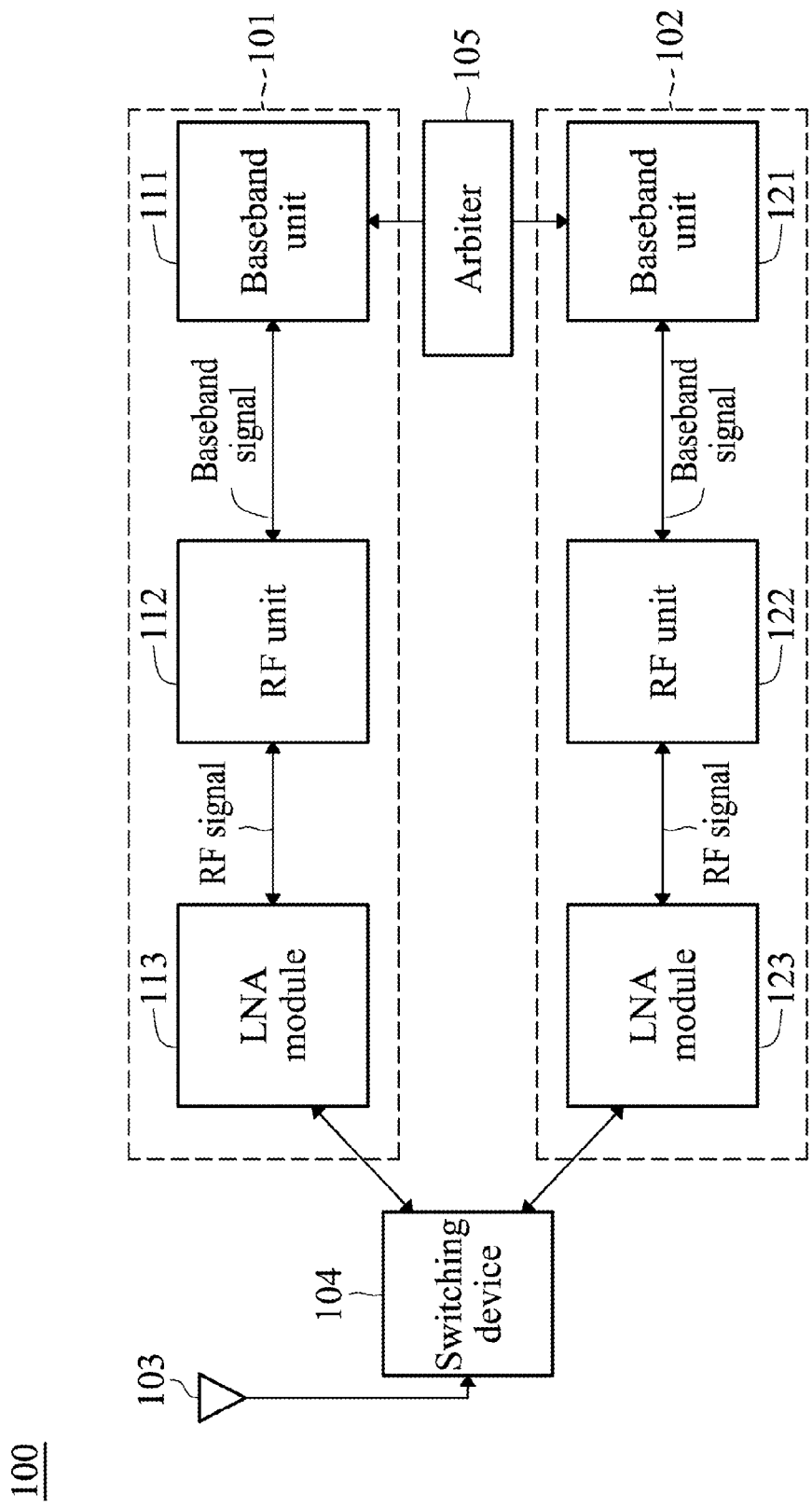
FIG. 1 shows a communications apparatus equipped with two different RAT modules according to an embodiment of the invention.

FIG. 1 shows a communications apparatus equipped with two different RAT modules according to an embodiment of the invention. The communications apparatus 100, which may be an MS, comprises two different RAT modules 101 and 102. Each RAT module having a communications interface conforming to a corresponding wireless communications protocol and transceiving radio frequency (RF) signals in a corresponding cellular network through the antenna may comprise a Baseband unit 111 or 121, a Radio Frequency (RF) unit 112 or 122 and a Low Noise Amplifier (LNA) module 113 or 123. Each of the Baseband units 111 and 121 may comprise a plurality of hardware devices to perform baseband signal processing. The baseband signal processing may comprise analog to digital conversion (ADC)/digital to analog conversion (DAC), gain adjusting, modulation/demodulation, encoding/decoding, and so on. Each of the RF units 112 and 122 may receive radio frequency wireless signals, convert the received signals to baseband signals, which are processed by a corresponding baseband unit, or receive baseband signals from a corresponding baseband unit and convert the received signals to radio frequency wireless signals, which are later transmitted. The RF unit may also comprise a plurality of hardware devices to perform radio frequency conversion. For example, the RF unit may comprise a mixer to multiply the baseband signals with a carrier oscillated in the radio frequency of the wireless communications system, wherein the radio frequency may be 900 MHz, 1800 MHz or 1900 MHz utilized in GSM systems, or may be 900 MHz, 1900 MHz or 2100 MHz utilized in WCDMA systems, or others depending on the RAT in use. Each of the LNA modules 113 and 123 may comprise one or more LNAs for amplifying the RF signals received from the antenna 103 based on the corresponding carrier frequency before being passed to the corresponding RF unit. The antenna 103 is arranged to transmit or receive the RF signals to or from the corresponding cellular network via the air interface for the corresponding RAT module.

According to the embodiments of the invention, the single antenna 103 is shared between different RAT modules 101 and 102. The switching device 104 is coupled between the shared antenna 103 and the LNA modules 113 and 123 and connects the shared antenna 103 to one of the LNA modules 113 and 123 so as to make the RF signals passing through the corresponding LNA to the destined RF unit. Generally, in a PLMN search procedure, the RAT module has to locate a suitable cell, which belongs to the corresponding PLMN of the RAT module, and camp on the suitable cell so as to use the wireless communications services provided by the PLMN. Because the single antenna 103 is shared between different RAT modules 101 and 102, the communications apparatus 100 may further comprise an arbiter 105 to coordinate radio activities requested by the RAT modules 101 and 102. With the coordinated radio activities for multiple RAT modules (such as the RAT modules 101 and 102) equipped in one communications apparatus, efficient and reliable radio services may be provided. Several embodiments of coordinating the radio activities between different RAT modules when sharing a single antenna will be given in the following paragraphs.

Figure 2:
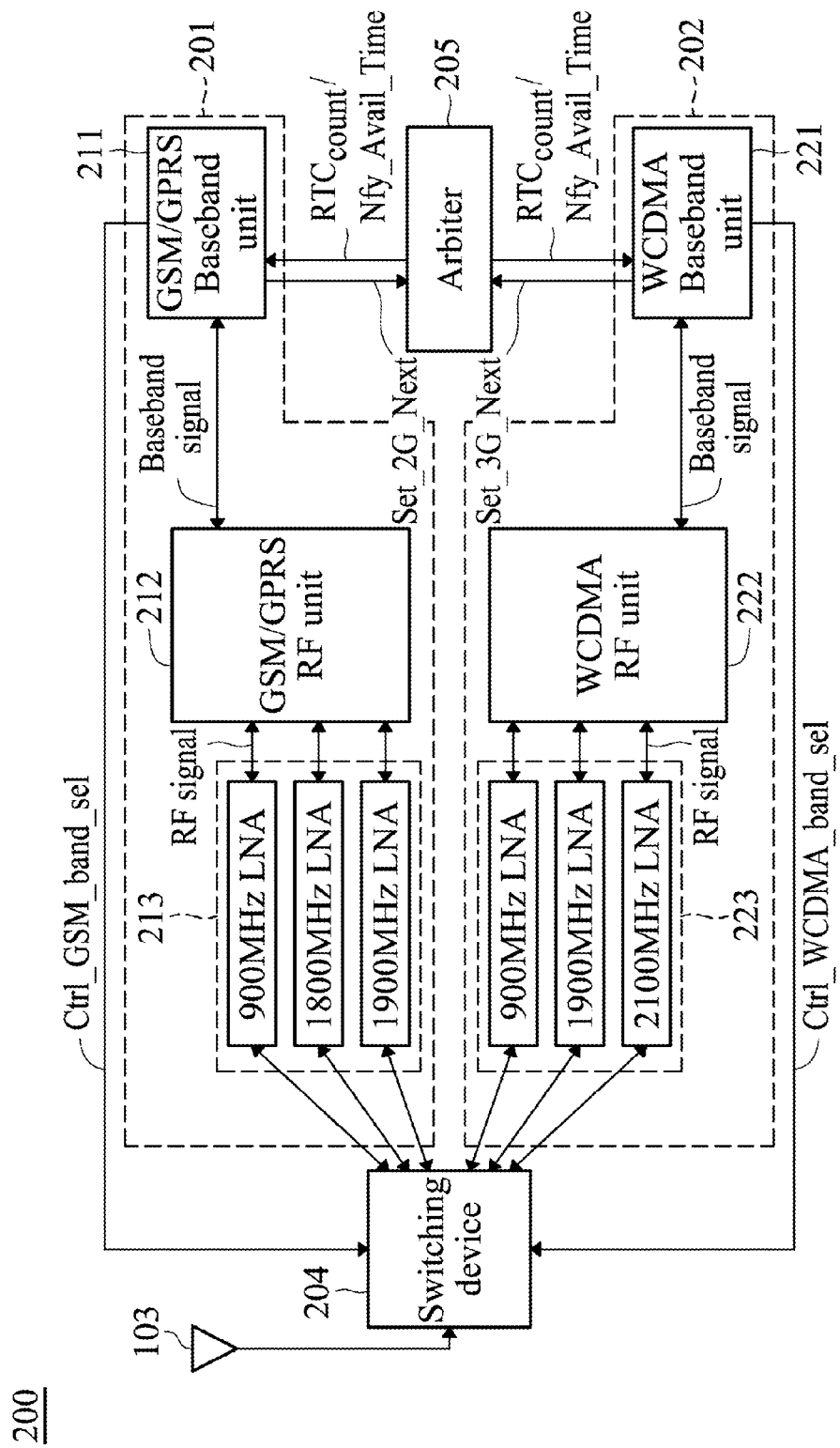
FIG. 2 shows a communications apparatus equipped with two different RAT modules according to an embodiment of the invention.

FIG. 2 shows a communications apparatus 200 equipped with two different RAT modules 201 and 202 according to an embodiment of the invention. Note that in this and the following embodiments, for illustration simplicity, the two RAT modules which are being used may respectively be a GSM/GPRS (also known as the second generation, 2G) communications module conforming to the GSM/GPRS communications protocol (also known as the second generation, 2G) and a WCDMA (also known as the third generation, 3G) communications module conforming to the WCDMA communications protocol. However, those skilled in the art will readily appreciate that concepts of the invention can also be applied to other RATs and the invention should not be limited thereto. In the embodiment of the invention, the LNA modules 213 and 223 may respectively comprise a plurality of LNAs each being designated for amplifying the RF signals of a corresponding 2G/3G band, where the 2G/3G band may be a 900 MHz, 1800 MHz, 1900 MHz, or 2100 MHz band, or others. The GSM/GPRS RF unit 212 or WCDMA RF unit 222 may measure the received RF signals and report to the GSM/GPRS Baseband unit 211 or WCDMA Baseband unit 221. Once one of the Baseband units attempt to perform a radio activity, such as a channel activity for transmitting or receiving information to or from the corresponding cell, or a measurement activity and performing a power scan or frequency scan of a serving cell or neighbor cell, or others, the Baseband unit making the attempt may issue a control signal Ctrl_GSM_bandsel or Ctrl_WCDMA_band_sel to the switching device 204 to direct the switching device 204 to connect the shared antenna to a designated LNA. The arbiter 205 is further arranged to coordinate and schedule radio activities requested by the RAT modules 201 and 202. Details of the hardware architecture and operation of the arbiter will be illustrated in the following paragraphs.

Figure 3:
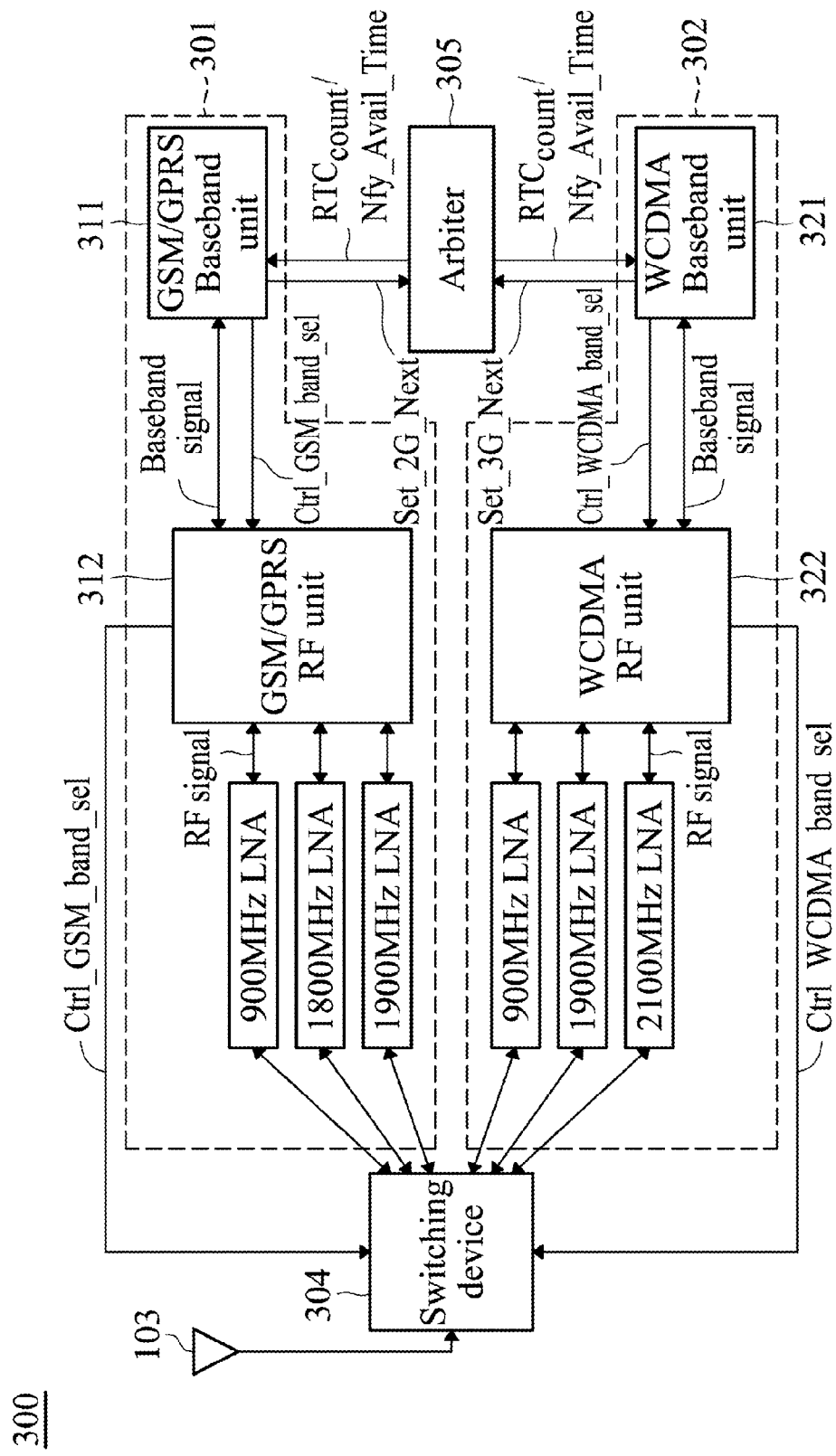
FIG. 3 shows a communications apparatus equipped with two different RAT modules according to another embodiment of the invention.

FIG. 3 shows a communications apparatus 300 equipped with two different RAT modules 301 and 302 according to another embodiment of the invention. Different from the hardware architecture as shown in FIG. 2, the GSM/GPRS Baseband unit 311 or WCDMA Baseband unit 321 issues the control signal to the switching device 304 via the corresponding GSM/GPRS RF unit 312 or WCDMA RF unit 322. Specifically, the GSM/GPRS RF unit 312 or WCDMA RF unit 322 controls the switching device 304 to connect the shared antenna to a designated LNA in terms of a control signal Ctrl_GSM_band_sel or Ctrl_WCDMA_band_sel from its corresponding GSM/GPRS Baseband unit 311 or WCDMA Baseband unit 321. The arbiter 305 is further arranged to coordinate and schedule radio activities requested by the RAT modules 301 and 302. Details of the hardware architecture and operation of the arbiter will be illustrated in the following paragraphs.

Figure 4:
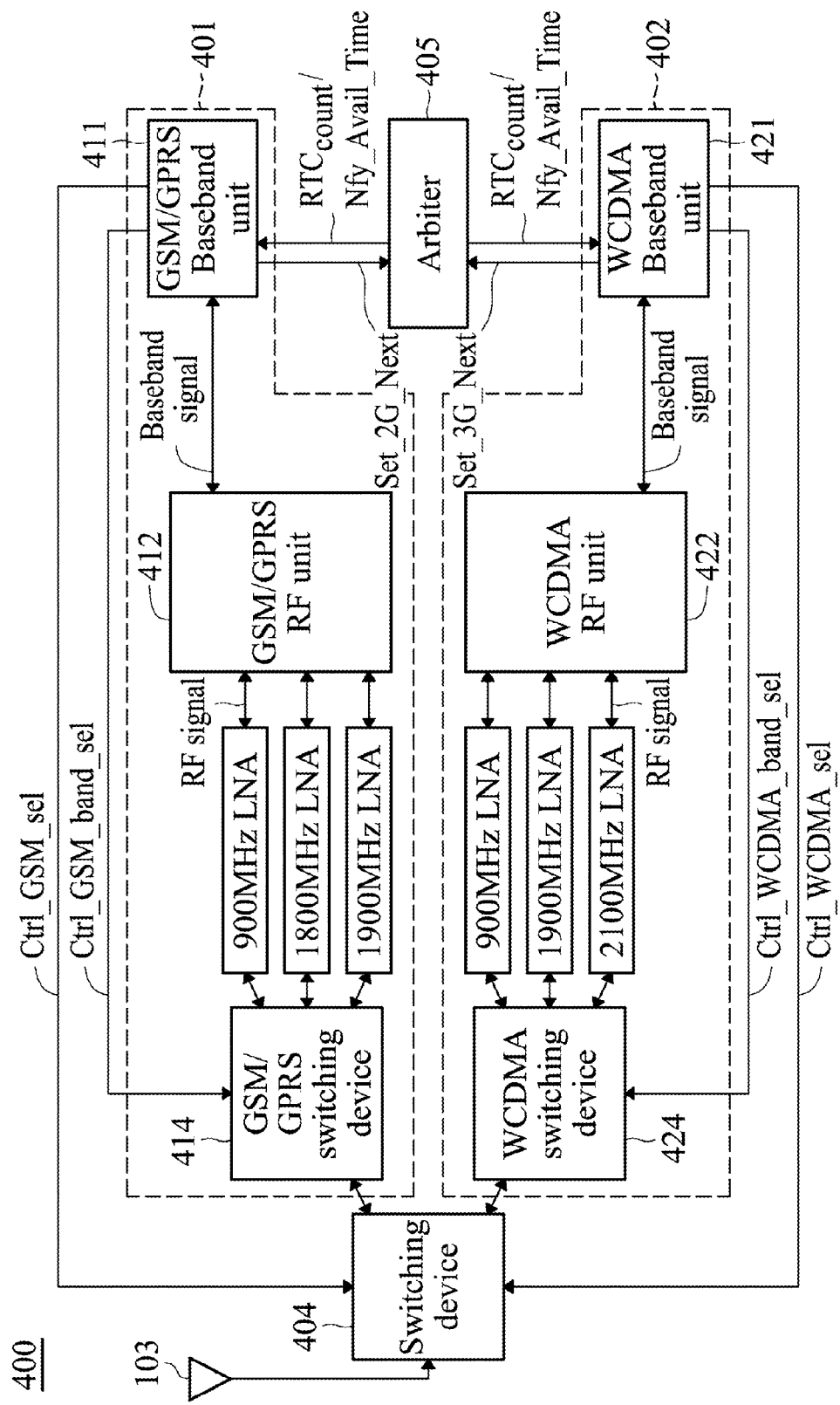
FIG. 4 shows still a communications apparatus equipped with two different RAT modules according to still another embodiment of the invention.

FIG. 4 shows still a communications apparatus 400 equipped with two different RAT modules 401 and 402 according to still another embodiment of the invention. The one-layer switching architecture as shown in FIG. 1 to FIG. 3 may be modified to a two-layer switching architecture. A first-layer switching device 404 is coupled between the shared antenna and second-layer switching devices to connect the antenna to one of the second-layer switching devices, such as the GSM/GPRS switching device 414 and WCDMA switching device 424. The GSM/GPRS switching device 414 is coupled between the first-layer switching device and multiple GSM band LNA to connect the first-layer switching device 404 to one designated GSM band LNA. Similarly, the WCDMA switching device 424 is disposed to connect the first-layer switching device 404 to one designated WCDMA band LNA. Once the baseband unit 411 or 421 attempts to perform a radio activity, it issues a control signal Ctrl_GSM_sel or Ctrl_WCDMA_sel to direct the first-layer switching device 404 to connect the shared antenna to one of the GSM and WCDMA switching devices 414 and 424, as well as, issues a control signal Ctrl_GSM_band_sel or Ctrl_WCDMA_band_sel to the corresponding switching device to connect to a designated LNA. The arbiter 405 is further arranged to coordinate and schedule radio activities requested by the RAT modules 401 and 402. Details of the hardware architecture and operation of the arbiter will be illustrated in the following paragraphs.

Figure 5:
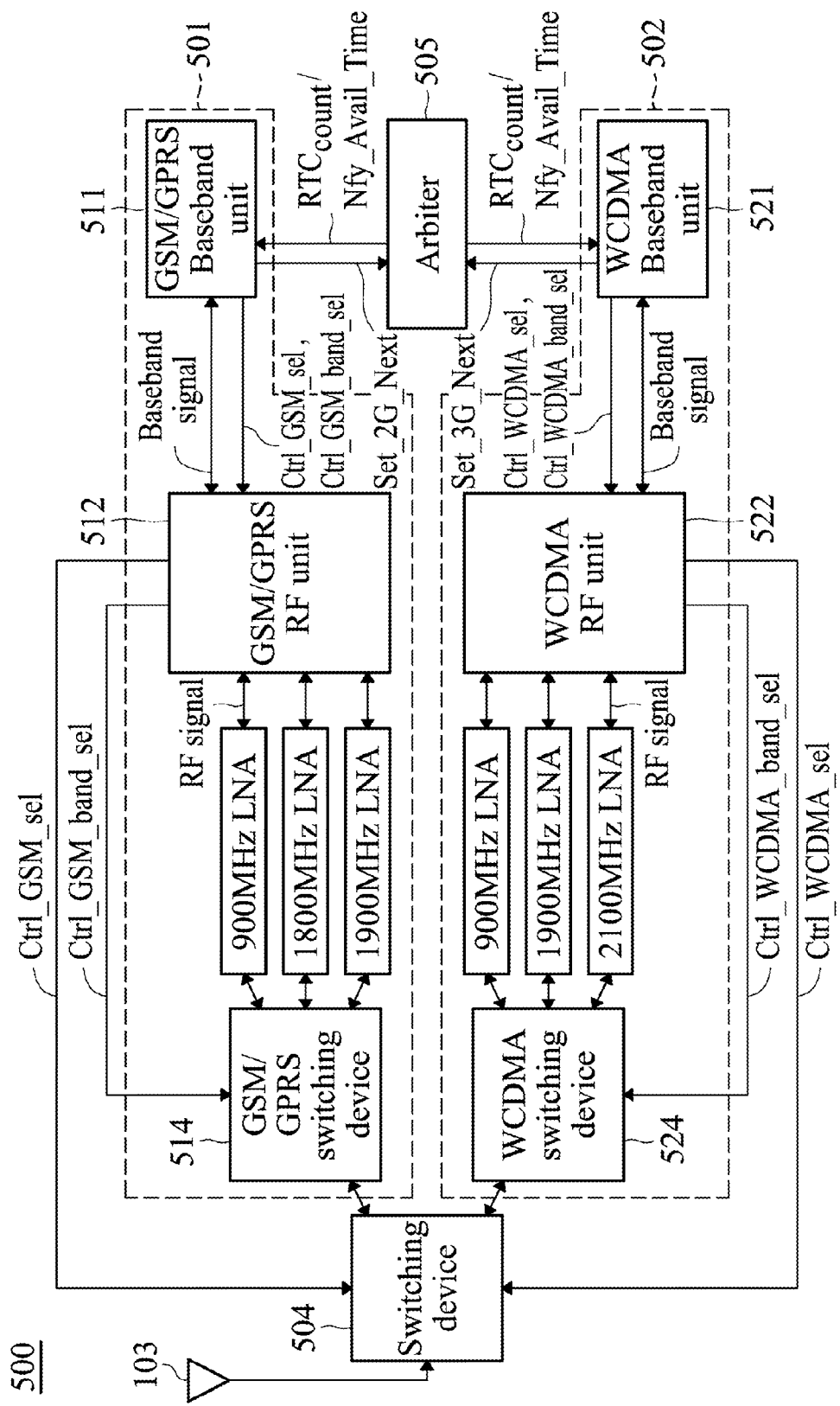
FIG. 5 shows still a communications apparatus equipped with two different RAT modules according to still another embodiment of the invention.

FIG. 5 shows still a communications apparatus 500 equipped with two different RAT modules 501 and 502 according to still another embodiment of the invention. Different from the hardware architecture as shown in FIG. 4, the GSM/GPRS baseband unit 511 and WCDMA baseband unit 521 issue the corresponding control signals Ctrl_GSM_sel/Ctrl_WCDMA_sel and Ctrl_GSM_band_sel/Ctrl_WCDMA_band_sel to the GSM and WCDMA switching devices 504, 514 and 524 via respective corresponding RF units 512 and 522. Specifically, an RF unit controls the switching devices 504, 514 and 524 to connect the shared antenna to a designated LNA in turn according to control signals Ctrl_GSM_sel/Ctrl_WCDMA_sel and Ctrl_GSM_band_sel/Ctrl_WCDMA_band_sel from its corresponding baseband unit 511 or 521. The arbiter 505 is further arranged to coordinate and schedule radio activities requested by the RAT modules 501 and 502. Details of the hardware architecture and operation of the arbiter will be illustrated in the following paragraphs.

Figure 6:
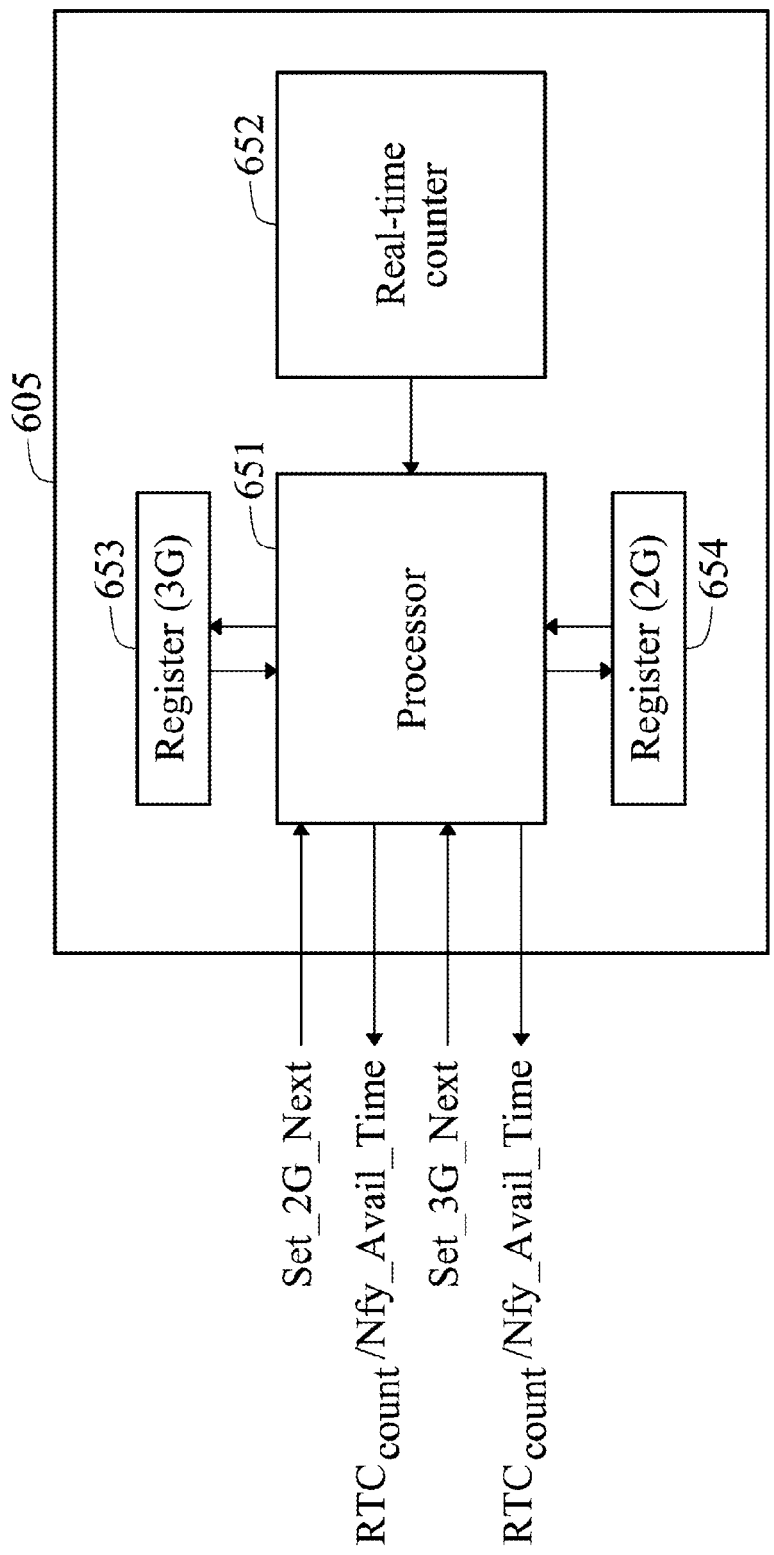
FIG. 6 shows a block diagram of an arbiter according to an embodiment of the invention.

FIG. 6 shows a block diagram of an arbiter according to an embodiment of the invention. According to an aspect of the invention, the arbiter 605 is implemented to facilitate scheduling of radio activities in a coordinated manner for different RAT modules. However, since the RAT modules equipped in the communications apparatus generally conform to different wireless communications protocols, such as the GSM/GPRS and the WCDMA communications protocols as previously described, the resolution of system clock corresponding to each RAT module may be different. Therefore, it becomes a difficult task to coordinate the radio activities for different RAT modules based on different system timing bases and independent hardware clock in the communications apparatus. According to an embodiment of the invention, a common timing base may be provided therebetween to facilitate coordination of radio activities, so as to prevent radio activity collisions when only one antenna is shared between different RAT modules. As shown in FIG. 6, a real-time counter (RTC) 652 installed in the arbiter 605 may comprise a free running clock with a specific frequency, such as 3.25 Mhz when enabled. Those skilled in the art may understand that the 3.25 Mhz is configured to support a ⅓ quarter bit (qbit) resolution (where the resolution of 1 qbit is 12/13 μs, therefore, the resolution of ⅓ qbit is 4/13 μs). A real time base (RTB) software module, when executed by a processor 651 of the arbiter 605, provides an interface to interact with the Baseband units of different RAT modules, such as the GSM/GPRS Baseband unit and WCDMA Baseband unit as illustrated above. The RTB software module may provide the current count value $RTC_{count}$ to the RAT modules as a reference count (e.g. $Count_{ref}$ as shown in FIG. 7). Note that the arbiter may also be integrated into either of the RAT modules and the invention should not be limited thereto.

According to the embodiments of the invention, each time a RAT module plans to perform a radio activity, such as a transmission (Tx) or a reception (Rx) channel operation, the start time of a next channel activity is also reported to the arbiter 605 by issuing a timing set command, such as the Set_2G_Next or Set_3G_Next shown in FIG. 6. According to the embodiment of the invention, the Baseband units or the arbiter may convert the time of the forthcoming channel activity into counts based on a previously received reference count (e.g. $Count_{ref}$ as shown in FIG. 7). The conversion is made from the timing base (that is, the time scale) of individual system clock to the above-mentioned common timing base. The reported start time may be represented by an absolute count value (e.g. $Count_{next}$ as shown in FIG. 7), which is determined with reference to the received reference count (e.g. $Count_{ref}$ as shown in FIG. 7). For example, the GSM/GPRS or WCDMA Baseband unit, or the arbiter may convert the 2G or 3G frame length to the next channel activity into counts based on a previously received reference count. According to an embodiment of the invention, when one of the RAT modules is a WCDMA (3G) module, and when a 3.25 Mhz RTC is running in the arbiter 605, the absolute count value for the start time of a forthcoming (i.e. next) 3G radio activity may be calculated by the following equation, $$Count_{next} = Count_{ref} + (X - RTB\_SYNC\_WTIME\_FN) * 32500 + (Y - RTB\_SYNC\_WTIME\_ECHIPS) * 325/3072, \quad \text{Eq. (1)}$$

where X represents a specific frame number of a WCDMA frame, in which the next radio activity is performed, RTB_SYNC_WTIME_FN represents a specific frame number of a WCDMA frame while the sync timing procedure is performed, Y represents an offset from the beginning of the (X)-th WCDMA frame to the start time of the next radio activity, and RTB_SYNC_WTIME_ECHIPS represents an offset from the beginning of the (RTB_SYNC_WTIME_FN)-th WCDMA frame to the time performing the sync timing procedure SYNC_TIME_WCDMA. According to the embodiments of the invention, the above-mentioned sync timing procedure may be periodically performed. In a sync timing procedure, the arbiter 605 may read the current count value of the RTC 652, and the RTB software module may directly provide (or with some mathematic transformation on) the currently read count value $RTC_{count}$ of the RTC 652 as the reference count (e.g. $Count_{ref}$ as shown in FIG. 7). Note that the one of ordinary skill in the art will readily appreciate that the above-mentioned sync timing procedure may also be performed when needed (that is, no need to be periodically), and the invention should not be limited thereto.

Figure 9:
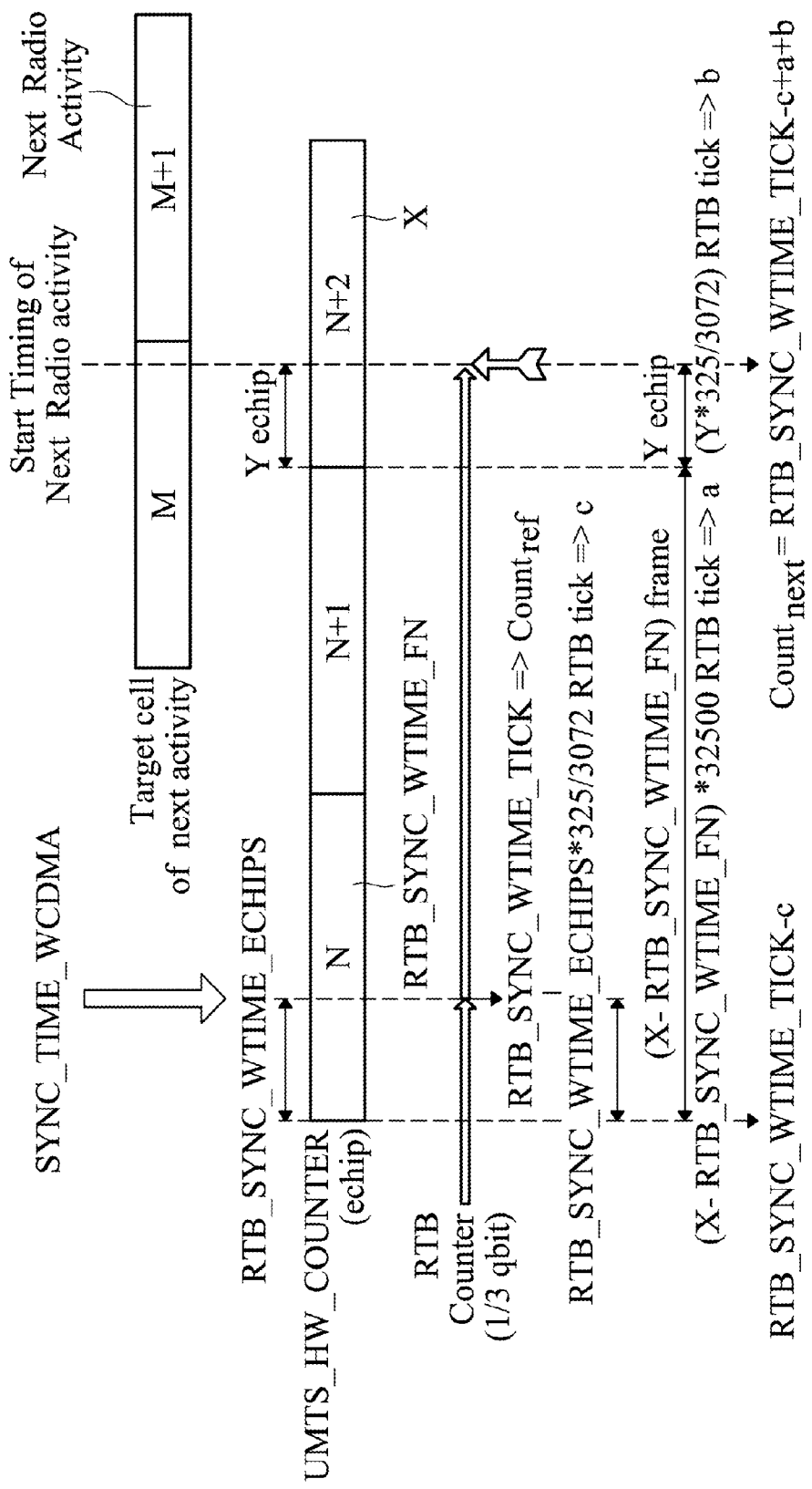
FIG. 9 is a timing diagram showing the mapping relationship between a WCDMA counter and a common RTB counter.

FIG. 9 is a timing diagram showing the mapping relationship between a WCDMA counter and a common RTB counter. The UMTS_HW_COUNTER with echip resolution (where echip=⅛ chip, and the resolution of an echip is 1/30.72 μs) is the WCDMA counter maintained by the WCDMA module to provide a system clock for the WCDMA module, where the system clock is synchronized with the WCDMA cellular network for transceiving information therebetween. Note that according to the embodiments of the invention, the resolution of the clock provided as the common timing base between different RAT modules is not necessarily to be finer than the resolution of the system clocks maintained by each individual RAT module. For example, the resolution of the common clock may be coarser than that of one or both of the RAT modules, or may be finer than that of one or both of the RAT modules. In one embodiment of the invention, the RTB counter with a ⅓ quarter bit (qbit) resolution (=4/13 μs) is coarse than that of the WCDMA system clock, and may still be provided as a common counter maintained by the processor 651 of the arbiter 605 to coordinate the timing between different RAT modules (for example, WCDMA and GSM/GPRS modules in this embodiment). Note that in the preferred embodiments of the invention, the resolution of the common clock may be designed to approximate to the resolution of one of the RAT modules.

As shown in FIG. 9, RTB_SYNC_WTIME_TICK represents the current count value $Count_{ref}$ of the RTB counter read in the current sync timing procedure, where the current sync timing procedure is preformed at the time as indicated by SYNC_TIME_WCDMA, X is the frame number of a WCDMA frame in which the next radio activity is performed, and RTB_SYNC_WTIME_FN is the frame number of a WCDMA frame while the sync timing procedure is performed. Y is an offset from the beginning of the (X)-th WCDMA frame to the start time of the next radio activity, and is further converted from the time scale of the UMTS_HW_COUNTER to the time scale of the RTB counter as (Y*325/3072) RTB tick (represented by the parameter 'b' for simplicity) so as to represent the corresponding count value of the RTB counter. RTB_SYNC_WTIME_ECHIPS is an offset from the beginning of the (RTB_SYNC_WTIME_FN)-th WCDMA frame to time of performing the sync timing procedure SYNC_TIME_WCDMA, and is further converted from the time scale of the UMTS_HW_COUNTER to the time scale of the RTB counter as (RTB_SYNC_WTIME_ECHIPS*325/3072) RTB tick (represented by the parameter 'c' for simplicity) so as to represent the corresponding count value of the RTB counter. (X-RTB_SYNC_WTIME_FN) is the difference of frame numbers between the forthcoming WCDMA frame in which has a next radio activity and the WCDMA frame while the current sync timing procedure is performed, and is further converted to the time scale of the RTB counter as (X-RTB_SYNC_WTIME_FN)*32500 RTB tick (represented by the parameter 'a' for simplicity) so as to represent the corresponding count value of the RTB counter. Finally, the count value $Count_{next}$ of the next WCDMA radio activity represented of in the time scale of the RTB counter is obtained by computing (RTB_SYNC_GTIME_TICK-c+a+b) as given in Eq. (1). Note that according to the embodiment of the invention, since the sync timing procedure may be regularly performed or performed when needed so as to update the reference count read from the RTC 652, the rounding error when performing the timing base conversion due to the difference in clock resolutions, such as the calculation shown in Eq. (1) or Eq. (2), may not be unlimitedly accumulated to cause the conversion error. Further, based on the regularly performed sync timing procedure, the conversion error due to the frequency drift of the system clock maintained by the individual RAT module with respect to the clock maintained by the corresponding base station in the cellular network may also be prevented.

According to another embodiment of the invention, when one of the RAT modules is a GSM/GPRS (2G) module, and when a 3.25 Mhz RTC is running in the arbiter 605, the absolute count value for a 2G radio activity may be calculated by the following equation, $$Count_{next}=Count_{ref}+(X-RTB\_SYNC\_GTIME\_FN)* 15000+(Y-RTB\_SYNC\_GTIME\_EBITS)*3/2, \quad \text{Eq. (2)}$$

where X represents a specific frame number of a GSM frame, in which the next radio activity is performed, RTB_SYNC_GTIME_FN represents a specific frame number of a GSM frame while the sync timing procedure is performed, Y represents an offset from the beginning of the (X)-th GSM frame to the start time of the next radio activity, and RTB_SYNC_GTIME_EBITS represents an offset from the beginning of the (RTB_SYNC_GTIME_FN)-th GSM frame to the time of performing the sync timing procedure SYNC_TIME_GSM.

Figure 10:
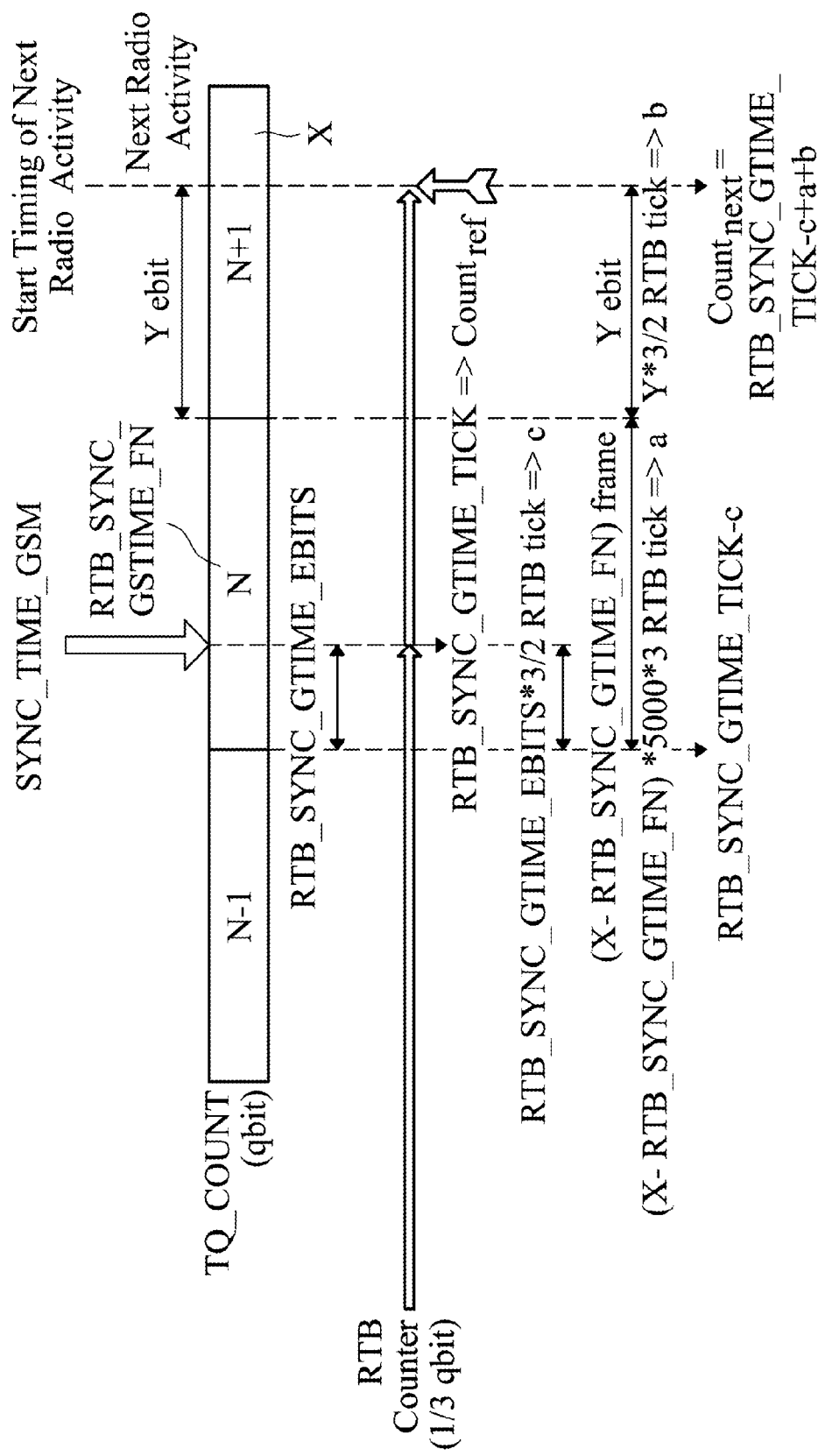
FIG. 10 is a timing diagram showing the mapping relationship between a GSM/GPRS counter and a common RTB counter.

FIG. 10 is a timing diagram showing the mapping relationship between a GSM/GPRS counter and a common RTB counter. The TQ_COUNT with quarter bit (qbit) resolution is the GSM/GPRS counter maintained by the GSM/GPRS module to provide a system clock for the GSM/GPRS module, where the system clock is synchronized with the GSM/GPRS cellular network for transceiving information therebetween. In the embodiment of the invention, the RTB counter with a ⅓ quarter bit resolution that is finer than that of the GSM/GPRS system clock is a common counter maintained by the processor 651 of the arbiter 605 to coordinate the timing between different RAT modules (for example, WCDMA and GSM/GPRS modules in this embodiment). As shown in FIG. 10, RTB_SYNC_GTIME_TICK represents the current count value $Count_{ref}$ of the RTB counter read in the current sync timing procedure preformed at the time SYNC_TIME_GSM, X is the frame number of a GSM frame in which the next radio activity is performed, and RTB_SYNC_GTIME_FN is the frame number of a GSM frame while the sync timing procedure is performed. Y is an offset from the beginning of the (X)-th GSM frame to the start time of the next radio activity, and is further converted from the time scale of the TQ_COUNT counter to the time scale of the RTB counter as (Y*3/2) RTB tick (represented by the parameter 'b' for simplicity) so as to represent the corresponding count value of the RTB counter. RTB_SYNC_GTIME_EBITS is an offset from the beginning of the (RTB_SYNC_GTIME_FN)-th GSM frame to the time of performing the sync timing procedure SYNC_TIME_GSM, and is further converted from the time scale of the TQ_COUNT counter to the time scale of the RTB counter as (RTB_SYNC_GTIME_EBITS*3/2) RTB tick (represented by the parameter 'c' for simplicity) so as to represent the corresponding count value of the RTB counter. (X-RTB_SYNC_GTIME_FN) is the difference of frame numbers between the forthcoming GSM frame which has a next radio activity and the GSM frame while the sync timing procedure is performed, and is further converted to the time scale of the RTB counter as ((X-RTB_SYNC_GTIME_FN)* 5000*3) RTB tick (represented by the parameter 'a' for simplicity) so as to represent the corresponding count value of the RTB counter. Finally, the count value $Count_{next}$ of the next GSM radio activity represented in the time scale of the of RTB counter is obtained by computing (RTB_SYNC_GTIME_TICK-c+a+b) as given in Eq. (2).

In the embodiments of the invention, the RTB software module receives and stores the reported start time $Count_{next}$ in a corresponding register, such as a 2G register 654 or 3G register 653, to indicate the start time for a forthcoming 2G or 3G radio activity. It is to be understood that the reported start time $Count_{next}$ may be alternatively stored in a specific address of a memory and the invention should not be limited thereto.

According to another embodiment of the invention, the reported start time may alternatively be represented by incremental counts up to the beginning of the forthcoming channel activity, denoted as ΔQty, as shown in FIG. 8. The RTB software module receives and adds the reported count value ΔQty to the current count value, and stores the computation result in a corresponding register, such as the 2G register 654 or 3G register 653, or a specific address of a memory, to indicate the start time for a forthcoming 2G or 3G radio activity. In some embodiments, the GSM/GPRS or WCDMA Baseband unit may alternatively issue a timing set command Set_2G_Next or Set_3G_Next carrying parameters of X, Y, RTB_SYNC_GTIME_FN or RTB_SYNC_WTIME_FN and RTB_SYNC_GTIME_EBITS or RTB_SYNC_WTIME_EBITS to the arbiter, without the RTC value synchronization therebetween as discussed above. Once receiving the timing set command, the RTB software module obtains the current time value $RTC_{count}$, accordingly calculates the absolute count value $Count_{next}$ for a 2G or a 3G channel activity, and stores the computation result in a corresponding register or a specific address of a memory.

In the embodiments of the invention, radio activities are generally represented as the activities of transceiving RF signals by using the antenna via the air interface. According to an embodiment of the invention, the radio activities performed by different RAT modules may further be grouped in two types, one is a channel activity type and the other is a measurement activity type. Channel activities, may refer to the activities for transmitting information to or receiving information from the cellular network. Since the cellular network often transmits or receives the information at a specific time according to the channel configuration, the channel activities may generally have to be performed at the specific time synchronized with the cellular network, or otherwise the information loss may happen. For example, the radio activities of listening to the system information block (SIB) channel in the WCDMA system, listening to the frequency correction channel (FCCH) in the GSM system, or the likes may be regarded as one of the channel activities. On the contrary, the measurement activities may refer to the activities that do not have to be performed at a specific time. In other words, the measurement activities may be performed any time when the RAT module determines that it is required. For example, the radio activities of power scan, frequency scan, measuring signal power of the serving cell, measuring signal power of the neighbor cell, or the likes may be regarded as one of the measurement activities. In the following paragraphs, several embodiments of coordinating the radio activities, including the channel activities and measuring activities, between different RAT modules based on the above-mentioned hardware architectures and common timing base (e.g. the RTB counter) when sharing a single antenna will be discussed in detail.

In the embodiments of the invention, the arbiter (such as the arbiter 105, 205, 305, 405, 505 or 605) may coordinate the radio activities requested by different RAT modules by using a clock (e.g. the RTB counter as previously described) with a resolution that is not necessary to be finer than that of the clocks individually used in the corresponding RAT modules as a common timing base. The arbiter or the corresponding RAT modules may convert time for the radio activities to be performed onto the time scale of the common clock, as the examples show in FIG. 9 and FIG. 10. According to an embodiment of the invention, when a RAT module transmits a request for using the shared antenna to perform a current radio activity, the request may carry information regarding timing of the current radio activity and a forthcoming radio activity. As previously described, the timing information may be represented by using the time scale of the clock utilized by the requesting RAT module, or the requesting RAT module may convert the timing onto the time scale of the common clock before transmitting the timing information to the arbiter, and the invention should not be limited thereto. In the embodiments of the invention, the timing information carried in the request may comprise the duration of the current radio activity and start time of the forthcoming radio activity. Upon receiving the request, the arbiter may estimate available time interval between the two successive radio activities requested by the same RAT module, and schedule at least one radio activity of a counterpart RAT module (different from the RAT module requesting the current radio activity) between the two successive radio activities when duration of a forthcoming radio activity of the counterpart RAT module fits in the available time interval. Specifically, the arbiter may interlace schedules for using the antenna of a plurality of first radio activities requested by a first RAT module and a plurality of second radio activities requested by a second RAT module so as to coordinate the radio activities in different RATs without radio activity collision.

For example, according to some embodiments of the invention, after obtaining a first start time of a forthcoming radio activity represented by the first clock from a first request transmitted by the first RAT module and a second start time and a duration of a forthcoming radio activity represented by the second clock from a second request transmitted by the second RAT module, the start time and durations carried in the first and second requests may be converted onto the time scale of the common clock and may further be stored in a register or a specific address of a memory. The arbiter may further determine whether the forthcoming radio activity for the first RAT module collides with the forthcoming radio activity for the second RAT module by inspecting whether the stored first start time falls within the converted duration after the converted second start time. When the stored first start time does not fall within the converted duration after the converted second start time, the arbiter may grant the second request. Otherwise, when the stored first start time falls within the converted duration after the converted second start time, the arbiter may selectively reject the second request. The arbiter may reject the second request when a priority of a radio activity carried by the second request is lower than that carried by the first request.

Figure 11:
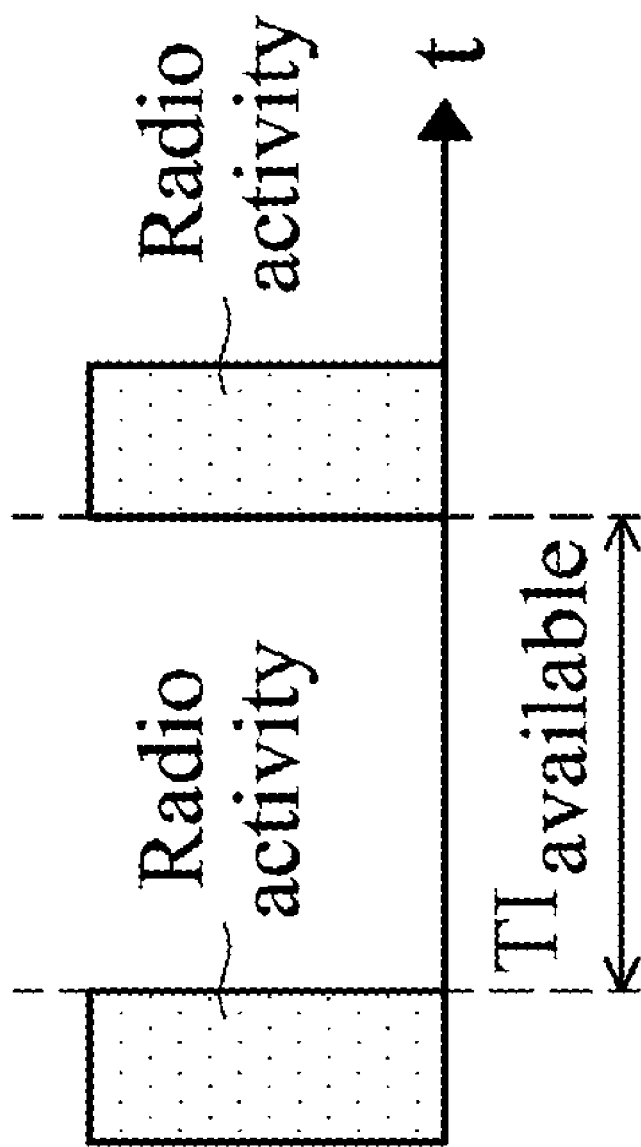
FIG. 11 is a timing diagram showing the available time interval between two radio activities.

According to another embodiment of the invention, after a radio activity has been completed, a corresponding Baseband unit may tick the RTB software module or transmit an indication signal to the RTB software to inform of its completion. When being ticked or receiving the indication signal, the RTB software module may calculate the above-mentioned available time interval, as the $TI_{available}$ shown in FIG. 11, to obtain the available time till the forthcoming radio activity that will be performed by the ticking Baseband unit, and notify the counterpart Baseband unit with a message Nfy_Avail_Time as shown in FIG. 2 to FIG. 6 containing the calculated available time interval in RTC counts. The notified Baseband unit may direct its corresponding RF unit to arrange radio activities during the available time interval $TI_{available}$.

The above-described embodiments of the present invention can be implemented in any of numerous ways. For example, the embodiments may be implemented using hardware, software or a combination thereof. It should be appreciated that any component or collection of components that perform the functions described above can be generically considered as one or more processors that control the above discussed function. The one or more processors can be implemented in numerous ways, such as with dedicated hardware, or with general purpose hardware that is programmed using microcode or software to perform the functions recited above.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. An apparatus for coordinating radio activities of different radio access technologies (RATs), comprising:
   a first RAT module, receiving and transmitting radio frequency (RF) signals from and to a first cellular network through an antenna, and synchronizing transceiving timings with the first cellular network using a first clock;
   a second RAT module, receiving and transmitting RF signals from and to a second cellular network through the antenna, and synchronizing transceiving timings with the second cellular network using a second clock; and
   an arbiter, coordinating a first radio activity requested by the first RAT module and a second radio activity requested by the second RAT module to avoid radio activity collision by using a third clock.

2. The apparatus as claimed in claim 1, wherein the third clock has a resolution which is coarser than that of one or both of the first and second clocks.

3. The apparatus as claimed in claim 1, wherein the arbiter converts time for the first and second radio activities to be performed onto the time scale of the third clock to coordinate the first and second radio activities.

4. The apparatus as claimed in claim 3, wherein the conversion is made based on reference timing information of the third clock obtained in a sync timing procedure, and wherein the arbiter regularly performs the sync timing procedure.

5. The apparatus as claimed in claim 3, wherein the conversion is made based on the time for the first/second radio activities to be performed and relationship between resolutions of the first/second clock and the third clock.

6. The apparatus as claimed in claim 1, wherein the arbiter coordinates the first and second radio activities by obtaining a first start time of a forthcoming radio activity represented by the first clock from a first request transmitted by the first RAT module, and converting the first start time onto the time scale of the third clock.

7. The apparatus as claimed in claim 6, wherein the arbiter coordinates the first and second radio activities by further estimating an available time interval to use the antenna between two successive first radio activities requested by the first RAT module, and schedules at least one second radio activity to be performed between the two successive first radio activities when duration of the second radio activity fits in the available time interval.

8. The apparatus as claimed in claim 6, wherein the arbiter stores the converted first start time in a register or a specific address of a memory.

9. The apparatus as claimed in claim 8, wherein the arbiter obtains a second start time and a duration of a forthcoming radio activity represented by the second clock from a second request transmitted by the second RAT module, converts the second start time and the duration onto the time scale of the third clock, and determines whether the forthcoming radio activity for the first RAT module collides with the forthcoming radio activity for the second RAT module by inspecting whether the stored first start time falls within the converted duration after the converted second start time.

10. The apparatus as claimed in claim 8, wherein the arbiter obtains a second start time and a duration of a forthcoming radio activity represented by the second clock from a second request transmitted by the second RAT module, converts the second start time and the duration onto the time scale of the third clock, and granting the second request when the stored first start time does not fall within the converted duration after the converted second start time.

11. The apparatus as claimed in claim 8, wherein the arbiter obtains a second start time and a duration of a forthcoming radio activity represented by the second clock from a second request transmitted by the second RAT module, converts the second start time and the duration onto the time scale of the third clock, and selectively rejecting the second request when the stored first start time falls within the converted duration after the converted second start time.

12. A method for coordinating radio activities of different radio access technologies (RATs), comprising:
   receiving, by an arbiter, a first request for using an antenna to perform a first radio activity, wherein the first request carries information regarding timing of the first radio activity and a forthcoming first radio activity and the timing is represented by using a first clock synchronized with a first cellular network from and to which a first RAT module receives and transmits radio frequency (RF) signals;
   receiving, by the arbiter, a second request for using the antenna to perform a second radio activity, wherein the second request carries information regarding timing of the second radio activity and the timing is represented by using a second clock synchronized with a second cellular network from and to which a second RAT module receives and transmits RF signals; and
   coordinating, by an arbiter, the first radio activity, the forthcoming first radio activity and the second radio activity without radio activity collision by using a third clock.

13. The method as claimed in claim 12, wherein the third clock has a resolution which is coarser than that of one or both of the first and second clocks.

14. The method as claimed in claim 12, further comprising:
converting, by the arbiter, the time of the first radio activity, the forthcoming first radio activity and the forthcoming second radio activity onto the time scale of the third clock; and
coordinating the first radio activity, the forthcoming first radio activity and the second radio activity by interlacing schedules for the first and second RAT modules to use the antenna.

15. The method as claimed in claim 14, further comprising:
performing a sync timing procedure to obtain a reference timing information of the third clock,
wherein the timing of the first radio activity, the forthcoming first radio activity and the second radio activity is converted onto the time scale of the third clock based on the obtained reference timing information.

16. The method as claimed in claim 14, wherein the conversion is made based on the timing for the first/second radio activities and relationship between resolutions of the first/second clock and the third clock.

17. The method as claimed in claim 12, wherein the timing information carried in the first request comprises duration of the first radio activity and start time of the forthcoming first radio activity, the timing information carried in the second request comprises duration of second radio activity, and the method further comprises:
estimating an available time interval to use the antenna between the first radio activity and the forthcoming first radio activity according to the timing information carried in the first request; and
scheduling the second radio activity between the first radio activity and the forthcoming first radio activity when the duration of the second radio activity fits in the available time interval.

18. A method for coordinating radio activities of different radio access technologies (RATs), comprising:
obtaining, by an arbiter, a first start time of a forthcoming radio activity represented by a first clock from a first request transmitted by a first RAT module;
converting, by the arbiter, the first start time onto the time scale of a third clock;
storing, by the arbiter, the converted first start time in a register or a specific address of a memory;
obtaining, by the arbiter, a second start time and a duration of a forthcoming radio activity represented by a second clock from a second request transmitted by a second RAT module;
converting, by the arbiter, the second start time and the duration onto the time scale of the third clock; and
determining, by the arbiter, whether the forthcoming radio activity for the first RAT module collides with the forthcoming radio activity for the second RAT module by inspecting whether the stored first start time falls within the converted duration after the converted second start time.

19. The method as claimed in claim 18, further comprising:
granting, by the arbiter, the second request when the stored first start time does not fall within the converted duration after the converted second start time.

20. The method as claimed in claim 18, further comprising:
selectively rejecting, by the arbiter, the second request when the stored first start time falls within the converted duration after the converted second start time.

* * * * *